United States Patent
Mattedi et al.

[11] 3,906,457
[45] Sept. 16, 1975

[54] DISPLAY SYSTEM FOR AN ELECTRONIC BUSINESS MACHINE

[75] Inventors: Bruno A. Mattedi, Villa Park; John J. Guagliardo, Chicago, both of Ill.

[73] Assignee: Victor Comptometer Corporation, Chicago, Ill.

[22] Filed: Feb. 15, 1974

[21] Appl. No.: 443,125

[52] U.S. Cl............................ 340/172.5; 340/366 R
[51] Int. Cl.[2]...................... G06F 3/14; G06K 15/18
[58] Field of Search .......... 235/168, 156; 340/172.5, 340/178, 366 R, 378 R

[56] References Cited
UNITED STATES PATENTS 3,610,902  10/1971  Rahenkamp ................ 235/172.5 X
3,806,711  4/1974  Cousins ...................... 235/168 X Primary Examiner—R. Stephen Dildine, Jr.
Attorney, Agent, or Firm—McCaleb, Lucas & Brugman

[57] ABSTRACT

A display system for use in an electronic business machine such as a cash register. A single alphanumeric display is operable to visually display both alphabetic messages and numeric transaction data. The display system includes a novel descriptor memory operable to store addressable coded message character signals representing operator messages. Such message character signals are drivingly connected to the display in response to predetermined operating conditions of the data processor which are to be indicated to the operator.

6 Claims, 3 Drawing Figures

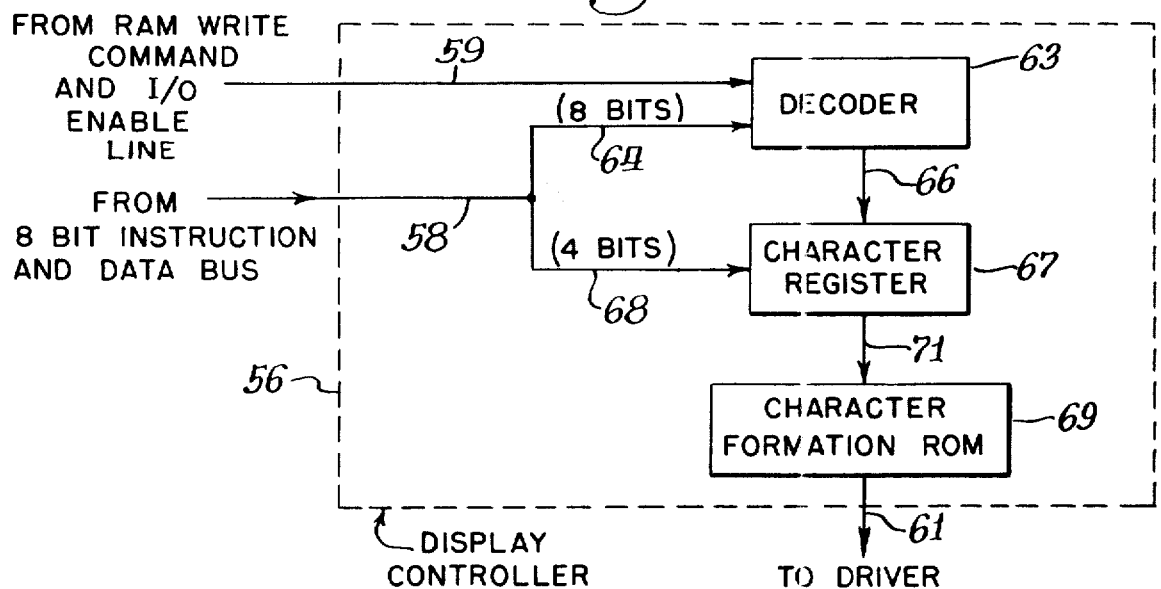
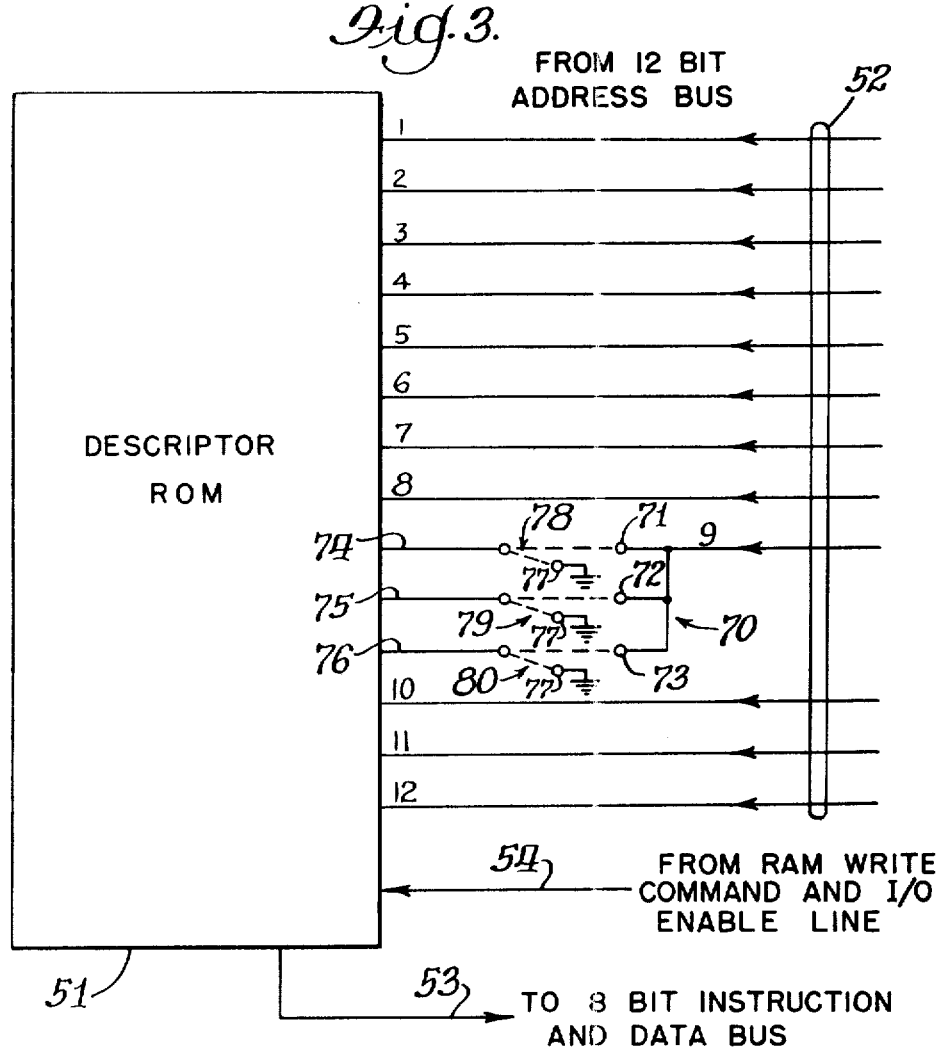

3,906,457

DISPLAY SYSTEM FOR AN ELECTRONIC BUSINESS MACHINE

BACKGROUND OF THE INVENTION

1. Field of the Invention

This invention generally relates to electronic business machines such as cash registers and, more particularly, to a novel numeric and message display system therefor.

2. Description of the Prior Art

Electronic business machines such as cash registers have been provided for recording sales and other business transactions occurring in retail stores. See, for example, Asbo et al U.S. Pat. No. 3,631,403, issued Dec. 28, 1971 and entitled "RETAIL SALES TRANSACTION TERMINAL;" and Ruben U.S. Pat. No. 3,748,452, issued July 24, 1973 and entitled "ELECTRONIC CASH REGISTER."

A typical electronic cash register generally comprises a digital data processor, a keyboard for entering numeric and functional transaction data, a tape printer, and a visual display device for displaying numeric transaction data. During a recorded transaction, both numeric and functional information must be entered into the data processor by manually actuating digit and function keys in a predetermined sequence. For example, the accumulated total of numeric entries corresponding to prices of purchased items is obtained by depression of the "total" function key prior to completion of the sale by depression of a "transaction" key. In devices disclosed in the prior art, annunciators such as illuminated lamps positioned behind printed legends are provided, frequently back-lighting certain of the function keys, to guide or direct the machine operator during various operating conditions of the data processor, including error conditions resulting from incorrect or erroneous key depressions. Stored program instructions determine which of the annunciators should be energized and under what condition such energization should occur.

However, the use of one character display for numeric data and an additional message display in the form of annunciators for operator messages has obvious disadvantages, a prominent one of which is that two separate and redundant display systems are required.

SUMMARY OF THE INVENTION

The present invention is directed toward an improved and more efficient visual display system for both numeric and message transaction data. The display system of the present invention includes a novel descriptor memory operable to store addressable coded message character signals representing operator transaction messages. Such message character signals are drivingly connected to an alphanumeric display in response to predetermined operating conditions of the data processor which are to be indicated to the machine operator.

The present invention is suitable for use in a known electronic business machine such as a cash register comprising: keyboard means having a plurality of manually operable keys for producing both numeric and functional data signals, read-only memory (ROM) means for storing addressable program instructions, random access memory (RAM) means for storing working transaction data, display means for visually displaying multiple characters indicating transaction data, printing means for providing a printed record of transaction data, digital processing means, address means connecting the processing means to address locations in both the ROM and RAM means, and instruction and data transfer means connecting the processing means with the keyboard means, the display means, the printing means and both the ROM and RAM means; and wherein the processing means is operable to obtain and execute the instructions to perform arithmetic and logical operations to produce and display the transaction data in response to the data signals from the keyboard means, the processing means being further operable to select message address locations in response to operating conditions to be indicated. This selection of message address locations to actuate various annunciator devices is accomplished by electronic cash registers disclosed in the prior art.

The display system of the present invention comprises: descriptor memory means connected to the address means and the transfer means of the business machine and operable to store and provide at the transfer means addressable coded message character signals, and display control means connecting the transfer means with the display means and having register means for storing the character signals. The processing means is operable in response to certain of the instructions to transfer the character signals from the descriptor memory means to the register means by means of the transfer means. The display control means is operable to drivingly connect the stored character signals to the display means for visually displaying transaction messages. The single display means is thereby operable to visually display both numeric and message transaction data.

The descriptor memory saves programming space in the program ROM which does not contain any of the message character signals, but is operable to select message address locations in the descriptor memory in response to operating conditions to be displayed. In addition, the descriptor memory stores multiple sets of coded character signals representative of multiple character descriptor names which are both printed and displayed to identify department products. The descriptor messages or names stored in the descriptor memory of the present invention, which can comprise either a ROM or a RAM, can be changed by merely substituting ROMs or changing alterable RAMS.

BRIEF DESCRIPTION OF THE DRAWINGS

FIG. 2 is a block diagram illustrating the basic features of the display controller of the display system shown in FIG. 1; and FIG. 3 is a block diagram of the descriptor memory of the display system shown in FIG. 1 and its associated electrical connections.

DESCRIPTION OF THE PREFERRED EMBODIMENT

Figure 1:
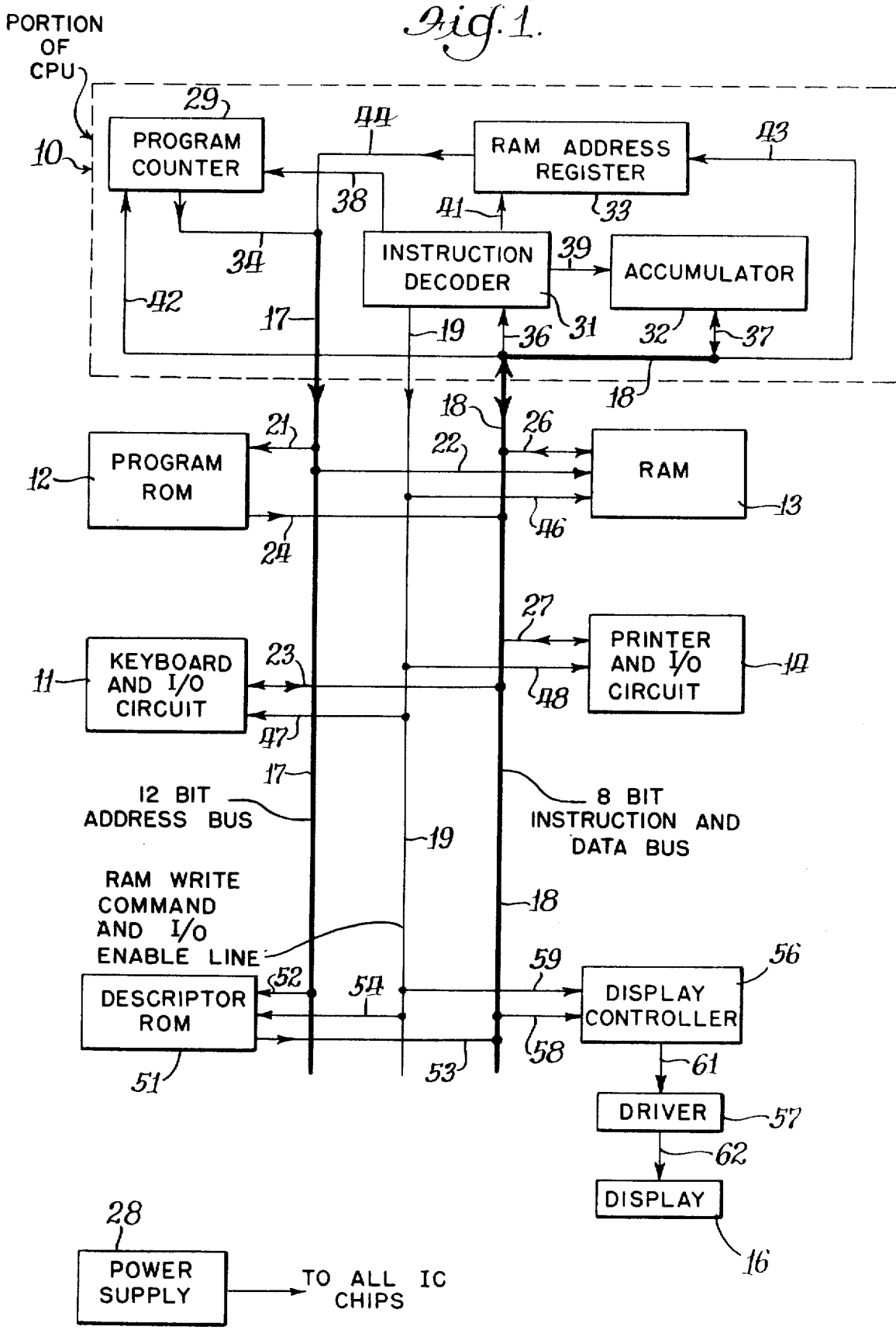
FIG. 1 is a simplified block diagram illustrating the basic figures of the display system of the present invention in an electronic business machine.

Turning now to the preferred embodiment of the present invention, reference is initially made to FIG. 1. As shown therein, an electronic business machine or transaction system such as a cash register typically includes a central processing unit (CPU) 10 or digital processing means, some of the essential features of which are illustrated in the dotted box, connected to the usual input and output devices. A keyboard means 11 comprising a known keyboard and an associated keyboard input-output (I/O) or buffer circuit is provided for producing numeric and functional data signals in response to the depression of one or more manually operable keys (not shown). A program read-only memory (ROM) means 12 is provided for storing addressable program instructions in a manner well-known in the art. The electronic business machine further comprises a known random access memory (RAM) means 13 for storing addressable working or variable transaction data. A printing means 14 comprising a printer and an associated printer I/O or buffer circuit is also included for producing printed documents of both business transaction information and summaries of transaction data. A known display means 16 is provided for visually displaying one or more characters of transaction data.

In order to interconnect the foregoing basic elements, the electronic business machine contains a twelve bit or line time-shared or multiplexed address bus 17 or address means connecting the central processing unit or CPU 10 to address locations in the program ROM 12 and the RAM 13 at different time intervals. An instruction and data bus 18 or instruction and data transfer means is also provided to connect the CPU 10 with the keyboard means 11, the program ROM 12, the RAM 13, the printing means 14 and the display means 16. In the preferred working embodiment of the present invention, the instruction and data bus 18 is also time-shared or multiplexed so that instructions and data are alternately carried during alternate time intervals; of course, separate instruction and data buses could be provided instead of a single time-shared bus. The instruction and data bus 18 is an 8 bit bus when operatively connected to the ROM 12, and a four bit bus in each of two directions when connecting the CPU 10 to the I/O circuits or to the RAM 13 (that is, to and from the RAM for both reading and writing operations).

The electronic cash register further comprises a RAM write command and I/O enable line 19 connecting the central processing unit with the RAM 13, the keyboard means 11, the printing means 14 and the display means 16. As described in detail later, the RAM write command and I/O enable line 19 has dual functions: first, signals on that line during certain time intervals indicate whether memory or I/O circuits are selected by the CPU 10; additionally, when the RAM 13 is selected, line 19 determines whether a reading operation alone or both reading and writing operations are to be performed.

As shown in FIG. 1, the address bus 17 is connected to the program ROM 12 and the RAM 13 by means of lines 21 and 22, respectively. The instruction and data bus 18 is connected to the keyboard means 11, the program ROM 12, the RAM 13 and the printing means 14 through lines 23, 24, 26 and 27, respectively. As indicated by the arrows thereon, line 24 is uni-directional; ROM 12 supplies stored instructions to the instructions and data bus 18. Lines 23, 26 and 27, however, are bi-directional; the keyboard means 11 and the printing means 14 are scanned periodically by the CPU 10 for numeric and functional data, and for status data, respectively; both reading and writing operations occur in the RAM 13.

The electronic cash register circuitry is generally contained within large-scale MOS integrated circuits. A power supply 28 is provided to connect appropriate supply voltages to all such integrated circuit chips in a well known manner, the power supply connections being omitted from the drawings for simplification.

The central processing unit 10 is operable to obtain and execute instructions stored within the ROM 12 to perform arithmetic and logical operations to produce and display transaction data in response to numeric and functional data signals from the keyboard means 11. The program ROM 12, essentially similar in function to a diode logic matrix, is programmed according to well-known techniques to perform its arithmetic and logical functions.

The CPU 10 comprises a known digital processing device comprising a program counter 29 for creating and storing addresses for the program ROM 12; an instruction decoder 31 for controlling all CPU registers to execute the program ROM instructions; an accumulator 32 including a binary adder and working registers (not shown) interconnected therewith for performing arithmetic and logic operations; a RAM address register 33 for storing address locations to be accessed in the RAM 13; and multiplexed receivers and drivers (not illustrated) for interfacing the central processing unit 10 with the address bus 17 and the instruction and data bus 18.

The design and operational details of the CPU 10 are well-known in the electronic computer art, and form no part of the present invention. Briefly, however in the operation of the CPU 10, the program counter 29 is sequentially decremented or otherwise controlled to create and store address locations for the ROM 12, the program counter 29 being connected to the address bus 17 by means of lines 34. In response to selection of a single address location, represented by an energization pattern of the twelve bits or lines of the address bus 17, the program ROM 12 produces at its output on lines 24 to the instruction and data bus 18 a corresponding instruction represented by the energization pattern of the eight bits or lines of the instruction and data bus. The addressed instruction is received by the CPU 10 and supplied to the instruction decoder 31 through lines 36, and to the accumulator 32 through bi-directional lines 37. The instruction decoder 31 contains logic circuits for decoding each ROM instruction and provides control signals on lines 38, 39 and 41, respectively connected to the program counter 29, the accumulator 32 and the RAM address register 33, to execute each instruction for performing data transfers, arithmetic operations and logical sequences in a well-known manner. Lines 42 connect the instruction and data bus 18 to the program counter 29 to operatively control the latter to select ROM address locations during branching operations. Lines 43 are provided for connecting the instruction and data bus 18 to the RAM address register 33.

The RAM address register 33 stores the next address location to be accessed in the RAM 13, and is connected to the address bus 17 through lines 44. During the time interval following that during which the program ROM 12 was addressed, the RAM address register 33 supplies the next address location to be accessed in the RAM 13 to the address bus 17 through lines 44. The RAM 13 comprises either a volatile semiconductor memory or a non-volatile magnetic core memory, both well-known in the computer art, for storing addressable working or variable transaction data. In response to a signal on the RAM write command and I/O enable line 19 over a line 46, the RAM 13 will be operatively controlled for reading only or both reading and writing operations. Because the eight bit instruction and data bus 18 functions as two 4-bit data buses (one in each direction) when operatively connected to the RAM 13, it is possible to read 4 bits from the designated RAM address location out to the instruction and data bus 18 and to simultaneously write four bits from that bus into that RAM address location.

During certain time intervals in the operating sequence of the processing means, the CPU 10 is operable to select I/O circuits instead of the RAM 13. For I/O circuit selection, the instruction decoder 31 provides an I/O selection or enable signal on the RAM write command and I/O enable line 19 connected to the keyboard I/O circuit through a line 47, and to the printer I/O circuit through a line 48. Preparatory to selection of an I/O circuit, the program ROM 12 supplies eight bits of data directly to all of the I/O circuits by way of the instruction and data bus 18, this data determining the selection of a particular one of the I/O circuits and commanding the function which the selected I/O circuit must perform. Thereafter, a transfer of data from the accumulator 32 to the selected I/O circuit occurs by way of 4 bits of the instruction and data bus 18, the selected I/O circuit usually simultaneously providing data to the accumulator by way of the other four bits of the instruction and data bus. The keyboard means 11, as noted earlier, is operable to provide both numeric and functional data signals for entry into the CPU 10. The printer I/O circuit of the printing means 14 obtains data to produce printer documents of certain information relating to business transactions. The ROM 12, the RAM 13 and the I/O circuits are repeatedly accessed until the program stored in the ROM 12 is executed for a given business transaction.

The program ROM 12 of CPU 10 is operable to select message address locations in response to operating conditions to be indicated, including error conditions resulting from erroneous or incorrect depressions of certain of the function keys of the keyboard means 11. Although the selection of such message address locations typically causes the actuation of various annunciator devices in prior known electronic cash registers to indicate operating conditions, the present invention utilizes such selection of message address locations to access a novel descriptor memory in turn operable to transfer coded message character signals to a control means for an alphanumeric display, the latter being operable to display operator messages.

For use in the foregoing transaction terminal, the present invention comprises a descriptor memory means 51 having connections from the address bus 17 and to the instruction and data bus 18 by means of lines 52 and 53, respectively. In the preferred embodiment of the present invention, the descriptor memory 51 comprises a read-only memory (ROM) contained within an integrated circuit chip; however, an alterable random access memory (RAM) could be used instead. The RAM write command and I/O enable line 19 is connected to the descriptor ROM 51 through a line 54. The descriptor memory is accessed in a manner similar to the RAM 13, signals on the RAM write command and I/O enable line 19 during predetermined time intervals controlling the selection of the I/O circuits or, alternatively, the RAM 13 and the descriptor memory 51. The descriptor memory 51 is operable to store and provide at the instruction and data bus 18 by means of lines 53 addressable coded message character signals representative of transaction messages to be displayed to the operator, the signals being preferrably sequentially addressable in message groups of four characters each.

The present invention further comprises a display control means including a display controller 56 and a driver 57 connecting the instruction and data bus with the display means 16. Electrical connections from the instruction and data bus 18 are provided to the display controller 56 by means of lines 58. Since the display control means is one of the I/O circuits, an I/O selection or enable signal from the RAM write command and I/O enable line 19 is provided during appropriate time intervals by means of a line 59. The display controller is connected to a known driver or amplifying means 57 by means of lines 61, the driver 57 being operatively connected to the display means 16 through lines 62.

With additional reference to FIG. 2, the display controller 56 comprises a decoding means 63 connected to line 59, and to the eight bits of the instruction and data bus by means of lines 58 and lines 64, data signals on these eight bits from the ROM 12 providing I/O selection and command information (as previously described). The decoder 63 comprises simple and easily designed gating circuits operable to provide a control signal at its output on lines 66 when the CPU 10 selects I/O circuits (by means of a signal on the RAM write command and I/O enable line 19) and, in addition, when the CPU selects the display controller 56 as a particular one of the I/O circuits (by means of the data signals from the ROM 12 by way of the instruction and data bus 18 and lines 58 and 64).

The display controller 56 further includes a character register means 67 for storing the character signals transferred from the descriptor memory 51 through the CPU 10. The register means 67 comprises a conventional register, constructed according to well-known techniques, having an input consisting of 4 bits of the 8 bit instruction and data bus 18 through lines 58 and four bit lines 68, these lines providing the descriptor data transferred through the CPU 10 by way of the instruction and data bus from the descriptor memory 51. The register 67 is connected to a character formation ROM 69 through lines 71, the latter comprising a simple read-only memory operable to translate or convert the coded message character signals stored by the register 67 into output signals on line 61 at appropriate time intervals to drive an alphanumeric display of known design. In the preferred working embodiment of the present invention, the display means 16 comprises a conventional 16 digit alphanumeric display having a cold cathode, gas-filled scanning-type display tube with associated control circuitry. All characters are formed by electrically controlled illumination of a combination of thirteen segments. The character formation ROM 69 is operable to convert the stored coded message character signals into control signals or voltages operable to illuminate predetermined combinations of the segments in order to form the alphanumeric characters.

In the operation of the display system of the present invention, as noted earlier, the ROM 12 of the CPU 10 is operable to select certain message address locations in response to predetermined operating conditions to be display indicated. When the CPU 10 selects one such address location, a program subroutine stored in the program ROM 12 corresponding to a transaction message to be displayed sets or loads the RAM address register 33 with the message starting address through lines 43. The RAM address register 33 in turn supplies this address to the address bus 17 by means of lines 44, the address bus 17 being operable to access the message starting address location in the descriptor memory 51 through lines 52. As each address location in the descriptor memory 51 is accessed, the latter provides at its output on lines 53 (in turn connected to the instruction and data bus 18) the coded message character signals corresponding to the message to be displayed. All character signals are then transferred by way of the CPU 10 to the character register 67 4 bits at a time tin accordance with a simple subroutine stored within the program ROM 12, the coded message signals being preferably sequentially addressable in message groups to facilitate their transfer. A total of 32 transfers of data are required in order to load message signals corresponding to 16 8-bit characters into the character register 67.

FIG. 3 is a block diagram of the descriptor memory 51 of the present invention and its associated electrical connections. The descriptor memory 51 preferably comprises a read-only memory contained within an easily replaceable integrated circuit chip constructed according to known techniques to store a dictionary of coded message character signals for thirty-two four-character operator transaction messages; as noted earlier, an alterable or programmable random access memory could be used instead of the read-only memory. Such messages include, for example, the following: VOID, CASH, PWR, CHEK, REFD, RE-ENTER, PAPR, ACCT and SALE. These descriptor transaction messages, when displayed by the display means 16, guide the machine operator by indicating predetermined operating conditions of the CPU 10 during execution of the program. For example, errorneous depression of one of the function keys of the keyboard means 11 will result in a display of the RE-ENTER message comprising two four-character message groups.

In addition to the foregoing transaction messages, the preferred descriptor memory 51 of the present invention further stores seven different sets of coded signals representative of four-letter department descriptor names identifying the department product keys in the keyboard means 11. Each machine system contains an identical department descriptor memory 51, but the particular group of department descriptor names selected for a particular retail store is determined by certain electrical connections preferably comprising wire straps connected during the installation of the machine. Thus, the same business machine can be adapted for use in various types of retail stores, the names of the department keys being effectively altered without changing the operating program of the machine. The department descriptor names are both displayed and printed in accordance with the stored instructions in the program ROM 12. If additional sets of department descriptor names or messages are required, the descriptor memory 51 can be easily changed, either by merely substituting a descriptor ROM or re-programming a descriptor RAM, as the case may be.

Each of the seven department descriptor name sections of the descriptor memory 51 stores a total of 32 descriptor names of four characters each, comprising eight common and twenty-four particular descriptor names, the latter corresponding to the 24 department product keys. The following descriptor names are representative of a few of those stored: GROC, MEAT, SODA, HSWE, CNDY, CARD, DRUG, TOBC, BEER, JWLY, FISH, HDOG, BURG and BEEF.

The descriptor memory 51 is addressed by the 12 bit address bus 17 connected to the 12 lines 52, the latter being numerically designated one through twelve in FIG. 3. The first 8 bits or lines 52 select the specific descriptor name data to be accessed in the descriptor memory 51, these lines being operable to address 256 address locations therein, 4 bits of descriptor data being stored in each location. Since 8 bits are required to describe one character, two address locations must be accessed to obtain the coded signals for each character. The last three of the lines 52 (lines 10, 11 and 12) are operable to select the descriptor memory 51. The ninth bit or line of the group of lines 52 is operable to select either the common group of operator messages or, alternatively, one of the seven department descriptor name sections. When the ninth bit is at a "0" logic state or condition, the common group of operator transaction messages is selected. When the 9th bit is in a "1" logic state or condition, however, one of the seven department descriptor sections is selected in accordance with the strap connections of the electrical strap connector means 70 for connecting the 9th bit with the descriptor memory 51.

As shown in FIG. 3, the ninth bit of lines 52 is connected to three terminals 71, 72 and 73, respectively associated with input lines 74, 75 and 76 connected to the descriptor memory 51. Each of the input lines 74, 75 and 76 is alternately strap-connected either to its associated terminal or to one of a group of ground connectors 77 by means of straps 78, 79 and 80, respectively, the possible connections being illustrated by the dotted lines in FIG. 3. One of the seven department descriptor sections is thereby selected in accordance with the unique preselected combination of strap connections between the lines 74, 75 and 76 either to ground or to an associated one of the terminals 71, 72 and 73.

It is thought that the invention and many of its attendant advantages will be understood from the foregoing description, and it is apparent that various changes may be made in the form, construction and arrangement of its component parts without departing from the spirit and scope of the invention or sacrificing all of its material advantages, the form described being merely a preferred embodiment thereof.

We claim:

1. In an electronic business transaction system having keyboard means with a plurality of manually operable keys for producing both numeric and functional data signals, read-only memory means for storing addressable program instructions, random access memory means for storing addressable working transaction data, display means for visually displaying multiple characters indicating transaction data, digital processing means, address means connecting said processing means to address locations in both said memory means, and instruction and data transfer means connecting said processing means with said keyboard means, said display means and both said memory means; and wherein said processing means is operable to obtain and execute said instructions to perform arithmetic and logical operations to produce and display said transaction data in response to said data signals from said keyboard means, said processing means being further operable to select message address locations in response to operating conditions to be indicated; a display system comprising: descriptor memory means connected to said address means and said transfer means and operable to store and provide at said transfer means addressable coded message character signals, and display control means connecting said transfer means with said display means and having register means for storing said character signals, said processing means being operable in response to certain of said instructions to transfer said character signals from said descriptor memory means to said register means by means of said transfer means, said display control means being operable to drivingly connect said stored character signals to said display means for visually displaying transaction messages; whereby said single display means is operable to visually display both numeric and message transaction data.

2. The display system of claim 1, wherein said character signals are sequentially addressable in message groups.

3. The display system of claim 1, wherein said display control means comprises decoding means and character formation read-only memory means.

4. The display system of claim 1, wherein said descriptor memory comprises a read-only memory contained within an integrated circuit chip.

5. The display system of claim 1, wherein said descriptor memory means is further operable to store, and provide at said transfer means in accordance with said instructions, coded character signals representative of multiple character descriptor means.

6. The display system of claim 5, wherein said descriptor memory means is operable to store plural different sets of said character signals representative of multiple character descriptor names, and electrical strap connector means connecting said address means with said descriptor memory means and having unique preselected electrical connections associated with each of said sets, said descriptor memory means being operable to provide said character signals for any preselected one of said sets as determined in accordance with the electrical connections associated therewith.

* * * * *